United States Patent [19]

Bartman

[11] 4,135,834
[45] Jan. 23, 1979

[54] DEVICE FOR TAKING UP SLACK AND SECURING CABLES, CHAIN MEMBERS OR THE LIKE

[76] Inventor: Daniel A. Bartman, R.D. #1, Austraw Rd., Ligonier, Pa. 15658

[21] Appl. No.: 852,107

[22] Filed: Nov. 16, 1977

[51] Int. Cl.² .............................................. F16B 7/06
[52] U.S. Cl. ........................................ 403/44; 254/67; 81/177 R; 403/46
[58] Field of Search .................. 403/43, 44, 45, 46, 403/47, 48, 17, 18, 19; 81/177 R, 177 E; 254/67, 54; 29/175 R; 280/179 R, 179 A

[56] References Cited

U.S. PATENT DOCUMENTS

| | | | |
|---|---|---|---|
| 831,597 | 9/1906 | Bowman | 403/44 X |
| 1,245,095 | 10/1917 | Flood | 403/46 |
| 1,732,789 | 10/1929 | Cornelius | 254/54 |
| 3,065,007 | 11/1962 | Colmer, Jr. | 403/45 |

FOREIGN PATENT DOCUMENTS 223238 12/1925 United Kingdom ............. 403/46

*Primary Examiner*—Andrew V. Kundrat
*Attorney, Agent, or Firm*—Jon M. Lewis

[57] ABSTRACT

A safety lock take-up turnbuckle device with a simple and inexpensive adjusting and locking mechanism which forms part of the device. The adjusting and locking mechanism prevents slipping of the turnbuckle and also theft of a load secured by the turnbuckle.

3 Claims, 2 Drawing Figures

DEVICE FOR TAKING UP SLACK AND SECURING CABLES, CHAIN MEMBERS OR THE LIKE

BACKGROUND OF INVENTION

1. FIELD OF INVENTION

This invention relates generally to securing devices for chains, cables or the like and, more particularly, to adjustment, tightening and locking mechanisms for use with chains, cables or the like when securing heavy loads.

2. DESCRIPTION OF THE PRIOR ART

Chains and cables used in securing heavy loads in the transportation thereof are often prone to slipping and loosening which require that the driver of a truck carrying a heavy load stop and check the load at frequent intervals. Loads do come loose and may be discharged on the highway creating very serious traffic hazards which can create considerable dangers and accidents with the potential for great liability. One example of a prior art device is Huber, U.S. Pat. No. 2,848,259, which shows an elaborate complex rachet interlocking mechanism with a series of complex and very expensive members. Another example of the prior art is Billett, U.S. Pat. Nos. 2,321,001, which shows a turnbuckle lock having a member with one portion having a left handed thread and another portion having a right handed thread for adjusting the turnbuckle lock and a pin, of the cotter pin type, for locking the turnbuckle to a locking plate. Another example of the prior art is Methias, U.S. Pat. No. 1,286,701, which shows a turnbuckle with a left handed and right handed portion for accepting a left handed and right handed bolt and wings with cotter pins disposed therethrough and also through the bolts for locking into the turnbuckle body. Other examples of the prior art are Schubert, U.S. Pat. No. 2,367,740, and Stukenborg, U.S. Pat. No. 2,843,407. In the two patents which use cotter pins, U.S. Pat. Nos. 2,321,001 and 1,286,707, these cotter pins can easily become dislodged or broken off due to the large stress forces impressed upon turnbuckles in mobile service. Also, cotter pins once lost are difficult to find which would require that a constant supply be kept on hand to relock and replace the lost or broken cotter pins. Also, in the event as is quite common in mobilely transported loads, vibrations will tend to shift the cables or chains securing the loads, and therefore, create a slack condition which must be removed by the take up thereof by a driver or the railroad worker. In taking up the slack the cotter pins must be removed and possibly lost or broken therefore presenting a rather cumbersome and intricate problem in readjusting the loan as is required in the previous applications. U.S. Pat. No. 2,848,259 is very complex in requiring a great number of parts which are machined to close tolerances which may malfunction when becoming rusted. This problem applies especially to the rachet mechanisms thereof. The theft of loads from flat bed trucks is a continuing problem and any device which would increase the safety and security of such loads is an important consideration in the choice of load chain and cable take-up devices.

SUMMARY OF THE INVENTION

A device for taking up slack in a chain, cable or the like comprising turnbuckle means having means at either end thereof for connection to load holding means; said turnbuckle means having means for tightening and loosening disposed thereon and attached thereto; means for adjusting said tightening and loosening means adapted to be intermittently engagable therewith; said means for adjusting said tightening and loosening means being disposed thereabout and extending substantially radially from an axis passing longitudilly through said turnbuckle means; means for facilitating the engaging and disengaging of said tightening and loosening means from said adjusting means; means for holding said means for adjusting in a predetermined relationship with respect to said tightening and loosening means, said holding means in combination with said facilitating means adapted to permit the engaging and the disengaging of said adjusting means with said tightening and loosening means such as to permit radial movement of said adjusting means from said longitudinal axis such that said adjusting means can assume a position being in disengagement with said tightening and loosening means having a maximum predetermined distance from said tightening and loosening means; and means for permitting the locking of adjusting means into a position in engagement with said tightening and loosening means such that said adjusting means is not disengagable from said tightening and loosening means.

DESCRIPTION OF THE PREFERRED EMBODIMENT

Figure 1:
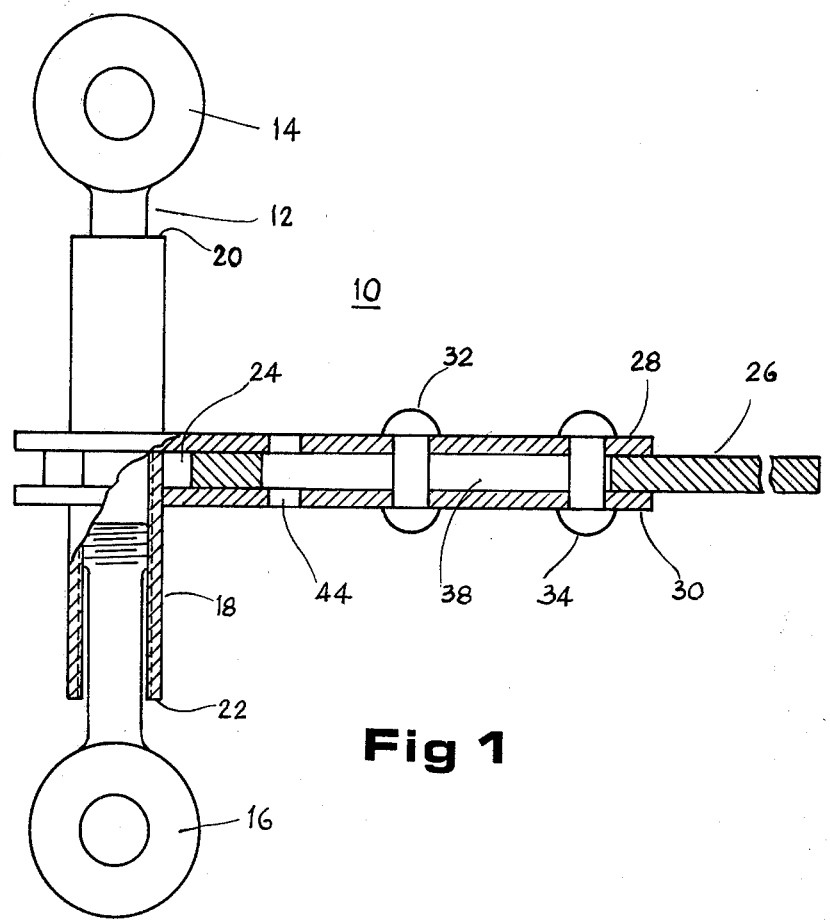
FIG. 1 is a top view of a safety lock take-up turnbuckle device according to the present invention.

Referring to the drawings, FIG. 1 shows a safety lock take-up device 10 having a turnbuckle member generally denoted as 12 with an eye bolt 14 having left handed threads at one end of the turnbuckle, and eye bolt 16 with right handed threads at the opposite end of the turnbuckle 12. The eye bolt 14 and 16 are screwed into a barrel 18 of the turnbuckle 12, with one end 20 having an internal left hand thread, and the other end 22 having an internal right hand thread, to thread together with the eye bolts 14 and 16, respectively. A nut 24, having preferably 6 sides, that is six angles, is welded substantially in the middle of the turnbuckle barrel 18. The nut 24 which is hexagonal in the preferred embodiment may be octaganal or any other shape which will engage in a turning device. A wrench handle member 26 is disposed such that it may engage and disengage the nut 24, which in the preferred embodiment is welded to the barrel 18. About each side of the nut 24, side pieces or plates 28 and 30 are disposed. Between the side plates 28 and 30 the wrench handle 26 is disposed. In order to hold the side plates 28 and 30 in place with respect to one another, two rivets 32 and 34 hold the side plates together and the handle wrench 26 therebetween.

Figure 2:
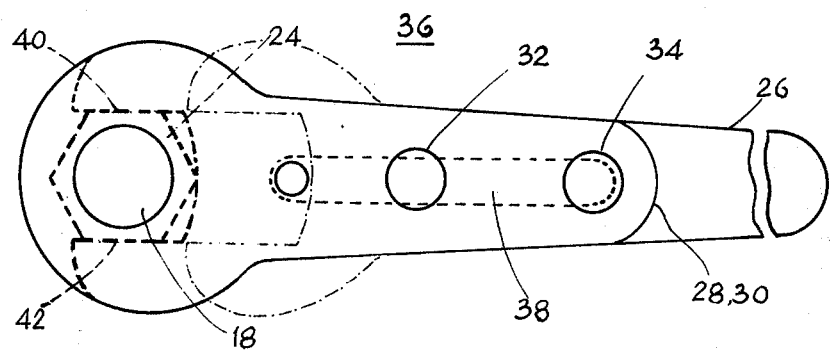
FIG. 2 is a side view of a wrench handle assembly of the device according to the present invention.

Referring now to FIG. 2, an assembly 36 is shown comprising the wrench handle member 26, the side plates 28 and 30, the rivets 32 and 34, in position disposed about the barrel 18 of the turnbuckle 12. As can be readily seen in FIG. 2, a slot 38 has been cut in the wrench handle member 26 such that the handle wrench member 26 may slide right and left guided by the rivets 32 and 34. The wrench handle member 26 either engages or disengages from the nut 24 such that, the entire assembly 36 can rotate freely about the barrel 18 and the nut 24. The wrench handle member 26 is disengaged from the nut 24 by pulling the right end thereof away from, that is to the right, such that flats 40 and 42 of the wrench handle member 26 are disengated from contact with the nut 24 as shown in the dotted position in FIG. 2. When the wrench handle member 26 is disengated from the nut 24, the entire assembly 36 may rotate freely about the barrel 18 of the turnbuckle 12, thereby permitting the wrench handle flats 40 and 42 to engage another portion of the nut 24 and once engaged to turn the nut 24 and thus the barrel 18 of the turnbuckle 12. By turning the turnbuckle in one direction the turnbuckle is loosened. That is, the eyelets of the eye bolts 14 and 16 move further apart. Likewise, by tightening the turnbuckle 12, the eyelets of the eye bolts 14 and 16 move closer together thereby tightening, for examble, a chain or cable, which is connected at both ends thereof to the eyelets of the eye bolts 14 and 16.

In order to prevent the assembly 36 from becoming disengaged, that is, the handle wrench member 26 from moving to the dotted position on the right in FIG. 2 and thereby permitting the flats 40 and 42 to disengage from the nut 24, holes 44 as shown in FIG. 1, are provided at the left end of the slot 38, as shown in FIG. 2, which accept a pin or preferably a padlock therethrough, thereby preventing the wrench handle member 26 from disengaging from the nut 24. After the load is tightened, preferably until it cannot be tightened anymore, one engages the wrench handle 26 to nut 24. The wrench handle 26 would then be restricted by hitting the load or bed of the flat bed truck, thus preventing its moving any further. The padlock or pin placed through hole 44 prevents the wrench handle member 26 from disengaging from nut 24. Since the wrench handle member 26 is hitting the load or bed of the truck without its disengaging from nut 24, the load can no longer loosen. Therefore, a load protected by a chain attached to the take-up device of the present invention cannot readily be stolen as with loads held by prior art devices. The theft of loads from flat bed trucks is a continuing problem and any device which would increase the safety and security of such loads is an important consideration in the choice of load chain and cable take-up devices.

As it may readily appear to those skilled in the art, various changes may be made in relative locations and arrangements of the several parts without departing from the sphere and scope of this invention. It is not meant to limit the invention except by the following claims

We claim:
1. A device for taking up slack in a chain, cable or the like comprising:
  a. turnbuckle means having means at either end thereof for connection to load holding means;
  b. said turnbuckle means having means for tightening and loosening disposed thereon and attached thereto;
  c. means for adjusting said tightening and loosening means adapted to be intermittently engagable therewith, said adjusting means comprising a wrench handle with a slot therein held between two plates having holes therein for passing said turnbuckle means therethrough;
  d. said means for adjusting said tightening and loosening means being disposed thereabout and extending substantially radially from an axis passing longitudilly through said turnbuckle means;
  e. means for facilitating the engaging and disengaging of said tightening and loosening means from said adjusting means;
  f. means for holding said means for adjusting in a predetermined relationship with respect to said tightening and loosening means, said holding means in combination with said facilitating means adapted to permit the engaging and the disengaging of said adjusting means with said tightening and loosening means such as to permit radial movement of said adjusting means from said longitudinal axis such that said adjusting means can assume a position being in disengagement with said tightening and loosening means having a maximum predetermined distance from said tightening and loosening means; and
  g. means for permitting the locking of adjusting means into a position in engagement with said tightening and loosening means such that said adjusting means is not disengagable from said tightening and loosening means.

2. The device for taking up slack in a chain, cable or the like according to claim 1 wherein said means for permitting locking comprising a hole in each of said plates.

3. The device for taking up slack in a chain, cable or the like according to claim 1 wherein said facilitating means comprises a slot.

* * * * *